United States Patent [19]

Lindörfer et al.

[11] Patent Number: 4,663,039

[45] Date of Patent: May 5, 1987

[54] APPARATUS FOR REMOVAL OF OIL FROM WATER AND ADSORBENTS USING GLYCOLIPIDS

[75] Inventors: Walter Lindörfer, Kassel; Walther Schulz, Vechta; Fritz Wagner, Stöckheim; Wilhelm Jahn-Held, Staufenberg, all of Fed. Rep. of Germany

[73] Assignees: Wintershall Aktiengesellschaft, Kassel; Gesellschaft fur Biotechnologische Forschung, Braunschweig-Stockheim, both of Fed. Rep. of Germany; part interest to each

[21] Appl. No.: 355,664

[22] Filed: Mar. 8, 1982

Related U.S. Application Data

[62] Division of Ser. No. 158,621, Jun. 11, 1980, Pat. No. 4,374,735.

[51] Int. Cl.⁴ .............................................. C02B 17/02
[52] U.S. Cl. ..................................... 210/241; 210/261; 210/532.1
[58] Field of Search ...................... 210/241, 532.1, 258, 210/261

[56] References Cited

U.S. PATENT DOCUMENTS

| | | | |
|---|---|---|---|
| 3,920,552 | 11/1975 | Elkern | 210/241 X |
| 4,082,672 | 4/1978 | Petroski | 210/241 X |
| 4,153,553 | 5/1979 | Davis | 210/241 X |
| 4,308,139 | 12/1981 | Diepho | 210/241 |

Primary Examiner—Tom Wyse
Attorney, Agent, or Firm—Florence U. Reynolds

[57] ABSTRACT

Oil polluted water or solid adsorbents are treated with microbially produced glycolipids to separate the oil phase. The treatment may be carried out in an apparatus which can be taken to the site and which comprises a mixing vessel supported by an undercarriage and provided with a storage container to supply the glycolipids, filling means, overflow discharge means and outlet means at its base.

6 Claims, 1 Drawing Figure

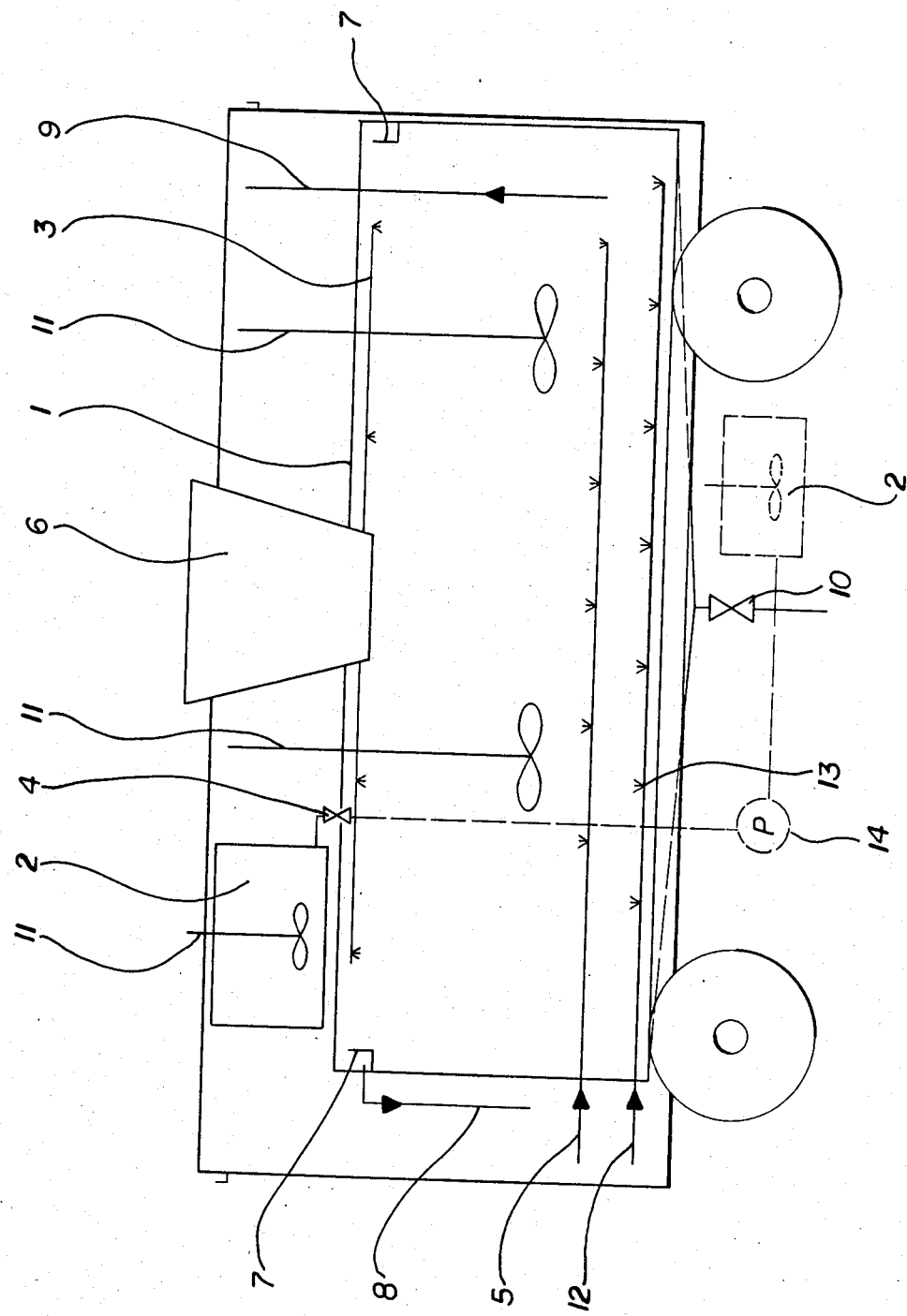

APPARATUS FOR REMOVAL OF OIL FROM WATER AND ADSORBENTS USING GLYCOLIPIDS

This is a division of application Ser. No. 158,621, filed June 11, 1980, now U.S. Pat. No. 4,374,735, issued Feb. 22, 1983.

BACKGROUND OF THE INVENTION

In co-pending application, Ser. No. 82,631 filed Oct. 5, 1979, there is described a process for separating oils or petroleum hydrocarbons from solid or solid-liquid mixtures thereof with soil, sand or residues, wherein this oil-containing mixture is mixed with an aqueous solution or dispersion of microbially produced glycolipids to form a slurry, from which the oilcontaining phase rising out of the aqueous phase is separated.

The object of said invention is to remove any oil pollution which may occur on banks and beaches by the sea, i.e. by salt water, as a result of tanker accidents or human or technical errors, or to separate the oily constituents from oil-containing residues, particularly those obtained from petroleum processing.

In addition to these objectives, there is also the problem of eliminating oil pollution which may occur inland and in fresh water, in order to protect the environment. Oil pollution of this kind may occur with the equipment used for transporting and processing petroleum, particularly in the immediate area of the plants used for this purpose and the pipelines and storage equipment for petroleum and petroleum products, as a result of the breakage of a pipeline or container, for example, or through human error or technical faults. Inland oil pollution of this kind may also be caused by accidents to tanker vehicles or by inexpert handling of mineral oils or the products obtained therefrom. In any case, such oil pollution constitutes a considerable danger to the natural ecological equilibrium of the polluted area and possibly to the water table as well, and must be eliminated.

It has now been found that the process of Ser. No. 82,631, filed Oct. 5, 1979 can be used for separating petroleum and petroleum products from the ground and from inland waters contaminated therewith and from materials used for the adsorption thereof.

BRIEF DESCRIPTION OF THE DRAWING

The drawing is a schematic view of an apparatus employed in separating oils or petroleum hydrocarbons from inland water and land areas and from oil adsorbents.

SUMMARY OF THE INVENTION

Any oil-polluted inland area or any oil-polluted inland water may serve as the starting material for the process according to the invention. First, the oil-polluted ground is taken up and comminuted as much as possible. Similarly oil-polluted water from inland waters or clarifying plants can be mixed with the microbially produced glycolipids, which are advantageously used in the form of an aqueous dispersion or a dry composition here. It is also possible to use a liquid, water-containing phase left behind when the solids have been separated from a solid-liquid mixture of substance.

Instead of the oil-polluted ground it is also possble to use materials which have been used for adsorption of oil. These include filtering and drying compositions as used in the petroleum processing industry, in order to clean and dry the products, for example. Advantageously, according to the invention, it is also possible to separate the adsorbed petroleum from adsorption materials which have been used for clearing up oil pollution on the surface of water and have then been removed again. Such materials include, as is well known, hydrophobic thermally expanded vermiculites or perlites which adsorp oil floating on water so that the solid phase saturated with oil can then be separated from the water.

DETAILED DESCRIPTION

The oil-containing saturated materials are mixed with an aqueous solution or dispersion of microbially produced glycolipids. The more water the starting material contains, the less need be added to the mixture with the glycolipids. Advantageously, instead of the glycolipids, the crude extract obtained in the production thereof can be used. This saves the technical work of isolating the glycolipids from this crude extract The glycolipids can be brought to the place of use in the form of a concentrate or as a dry substance and are only dissolved in water when they arrive. Glycolipids prepared from a mixture of alkanes with 12 to 19 carbon atoms in the molecule or from crude oil in a manner known per se, using the microorganism *Nocardia rhodochrous* species or *Mycobacterium phlei*, have proved particularly suitable for the process according to the invention. Mono- and diesters of $\alpha, \alpha'$-trehalose and long-chain $\alpha$-alkyl-$\beta$-hydroxy fatty acids are also suitable as glycolipids. These glycolipids are advantageously mixed with the oil-polluted starting material as an aqueous solution or dispersion which contains the glycolipids in a concentration of from 0.01 to 5.0 g/l.

The following is an example of the preparation of glycolipids in the form of a crude extract.

A 700 liter bioreactor fitted with a Kaplan turbine and cylindrical guide member is filled with 500 l. of nutrient solution with the following composition: 1000 g of $(NH_4)_2SO_4$, 500 g of $KH_2PO_4$, 1000 g of $K_2HPO_4.3H_2O$, 500 g of $Na_2HPO_4.2H_2O$, 250 g of KCl, 100 g of $MgSO_4.7H_2O$, 100 g of yeast extract dissolved in 500 l. of fresh water and 10 kg of an n-alkane mixture with a chain length of $C_8$ to $C_{24}$, then it is inoculated with 50 l. of inoculum from a *Nocardia rhodochrous* species culture, and cultivated at 32° C. at an aeration rate of 1.0 vol/vol/min at a revolution rate of 1,800 rpm and at a pressure in the reactor of 2 bars.

During cultivation, the submerged culture is automatically adjusted to a pH of 6.8 by a pH regulating means, by the addition of 25% by volume ammonia solution. After 32 hours, the submersed culture is transferred into a counterflow extraction apparatus and extracted exhaustively with 200 l. of extracting agent consisting of 180 l. of methylene chloride and 20 l. of methanol. After the extraction agent has been evaporated off, 1.22 kg of a glycolipid- containing crude extract are obtained which is used to prepare the aqueous dispersion, typically in the amount of 0.01 to 5.0 g/liter, The crude extract contains the following glycolipids as its main constituents:

192 g of 6,6'-di-O-$\alpha$-tricanyl-$\beta$-hydroxy- docosanoyl-$\alpha, \alpha'$-trehalose 178 g of 6,6'-di-O-$\alpha$-dodecanyl-$\beta$-hydroxy-docosanoyl-$\alpha, \alpha'$-trehalose 144 g of 6,6'-di-O-$\alpha$-decanyl-$\beta$-hydroxy-pentacosanoyl-$\alpha, \alpha'$-trehalose.

Mixing of the aqueous solution or dispersion of the glycolipids with the oil-containing starting material may be effected using mechanical means, such as stirrers, for example. An equally effective method is to pass a fragmented air current through the resulting slurry during the addition of the glycolipid solution or dispersion. This air current causes more rapid rising of the oil phase and thus speeds up its separation from the aqueous phase.

After the glycolipid solution or dispersion has been mixed in, the resulting slurry is allowed to stand, preferably until the supernatant oil phase is sharply separated from the aqueous phase. The separation of the oil and water can be aided by adding conventional known emulsion breaking agents.

After the phase separation of the supernatant oil phase from the underlying aqueous phase containing all the solids, the two phases are separated from each other. To do this, the oil phase may be mechanically removed by suction, for example, and any remaining film of residual oil on the aqueous phase can be removed with known adsorption agents in a manner known per se. Similarly, the aqueous phase can be drawn off first, so that the oil phase is left behind.

The oil phase obtained according to the invention can be fed into a processing cycle for oils of similar composition, without any further preparation, and be processed to yield technically useable products, whilst the aqueous phase containing solids but now oil-free is discharged into the environment, for example into sewers, clarifying plants or main sewer canals.

An apparatus which is particularly suitable for the process according to the invention is shown in the drawing and is a mobile apparatus comprising a storage container 2 and a mixing vessel 1, mounted on an undercarriage, whilst a feed line 3 with a regulator 4 passes from the storage container 2 into the mixing vessel 1, the latter having a means for supplying water 5, and filling means 6, for the oil-containing material, an overflow 7 with discharge means 8 and an inclined base with a regulatable and closeable outlet 10 mounted on its lowest point.

The storage container is used for storing the glycolipids, preferably in the form of a dry substance or concentrate or an aqueous solution or dispersion. The glycolipids are fed in metered amounts into the mixing vessel 2 through the feed line 3 with a regulator 4 passing from the storage container 2, after the oil-polluted starting material has been introduced into the mixing vessel 1 using the filling means 6, such as, for example, a hopper, bucket conveyor, conveyor belt or the like.

Mixing the oil-polluted starting materials with the aqueous solution or dispersion of glycolipids may be effected by means of a stirrer 11 which may be fitted to the mixing vessel 1. This mixing may also, advantageously, be carried out using air which is fed into the mixing vessel through an air supply line 12 whose free end projecting into the mixing vessel and located in the lower part of the mixing vessel is connected to a distribution means comprising a plurality of outlet openings 13 for the air to escape through. The compressed air supplied through these components of the apparatus from an air compressor or other source of compressed air rises inside the filling contained in the mixing vessel, divided up into a plurality of jets of air, and not only mixes the contents of the mixing vessel but also helps the oil phase to come to the top.

The storage container 2 may be mounted above the mixing vessel 1 so that the contents of the storage container 2 can be passed into the mixing vessel 1 by gravity. If the two vessels are arranged in any other way relative to each other, a pump 14 capable of conveying the contents of the storage container 2 into the mixing vessel 1 may advantageously be provided in the feed line 3 leading from the storage container 2 to the mixing vessel 1.

The oil phase floating on the contents of the mixing vessel which have been treated according to the invention can flow out via an overflow 7 with discharge means 8 provided in the mixing vessel 1 and can then be loaded into tankers or other oil transporting means and be taken away.

The aqueous phase containing the solids can be drawn off through the outlet 10 which is mounted on the lowest point of the inclined base of the mixing vessel 1. However, it is also possible to draw off one of the phases through a suction drainage duct 9 which is adjustable in height which is provided in the mixing vessel 1 and projects with its free end into the mixing vessel 1, the length of this duct corresponding substantially to the height of the mixing vessel. If the aqueous phase is to be drawn off using this suction pipe, the free end of the suction pipe is placed as near the base of the mixing vessel as possible. For drawing off the oil phase, it is advisable to lower the free end only to a point just above the line of separation between the oil and water phases in the mixing vessel and then lower it progressively as the oil level falls, until it reaches the surface of the aqueous phase.

This mobile separating apparatus for performing the process used according to the invention has the advantage that it can be taken to the site of the oil pollution and be put into operation there. It does away with the need to transport the contaminated ground or water to a separation plant at a fixed site.

In conjunction with the process to be used according to the invention, this apparatus according to the invention makes it possible to recover the oil from the polluted material at the site of the oil pollution, in a form which can be processed to yield oil products, and to leave the decontaminated material where it is.

We claim:

1. An apparatus for separating oils or petroleum hydrocarbons from mixtures thereof with water or solid materials, said apparatus comprising an undercarriage, a mixing vessel having an inclined base and supported by said undercarriage, a storage container, a feed line having a regulator and connecting said storage container to said mixing vessel, means for supplying water to said mixing vessel, means for filling said mixing vessel with said mixtures, a trough-shaped overflow channel on said mixing vessel for separating supernatant oil, a discharge means connected to said overflow, and a regulatable closeable outlet mounted at the lowest point of said inclined base.

2. The apparatus according to claim 1, wherein said mixing vessel comprises a suction drainage duct which is adjustable in height and projects with its free end into the mixing vessel and the length of which corresponds substantially to the height of the mixing vessel.

3. The apparatus according to claim 1 or 2, wherein said mixing vessel is fitted with a stirrer means.

4. The apparatus according to claim 1 or 2, wherein said mixing vessel is provided with an air supply line whose free end projects into the mixing vessel and is connected to a distribution means having a plurality of outlet openings.

5. The apparatus according to claim 1, wherein the storage container is mounted above the mixing vessel.

6. The apparatus according to claim 1, wherein a pump is inserted in the feed line passing from the storage container to the mixing vessel.

* * * * *